(12) United States Patent
Feng et al.

(10) Patent No.: US 11,367,284 B2
(45) Date of Patent: Jun. 21, 2022

(54) METHOD AND APPARATUS FOR COMMENTING VIDEO

(71) Applicant: BEIJING BAIDU NETCOM SCIENCE AND TECHNOLOGY CO., LTD., Beijing (CN)

(72) Inventors: Bohao Feng, Beijing (CN); Xiaoshuai Zhang, Beijing (CN); Xingbo Chen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/117,018

(22) Filed: Dec. 9, 2020

(65) Prior Publication Data
US 2021/0357653 A1 Nov. 18, 2021

(30) Foreign Application Priority Data
May 15, 2020 (CN) .......................... 202010414326.4

(51) Int. Cl.
*G06V 20/40* (2022.01)
*G06T 7/73* (2017.01)
(Continued)

(52) U.S. Cl.
CPC .............. *G06V 20/47* (2022.01); *G06T 7/248* (2017.01); *G06T 7/73* (2017.01); *G10L 13/02* (2013.01);
(Continued)

(58) Field of Classification Search
CPC ....... G06K 9/00751; G06T 7/73; G06T 7/248; G06T 2207/10016; G10L 13/02; G11B 27/10
See application file for complete search history.

(56) References Cited

U.S. PATENT DOCUMENTS

2017/0316256 A1* 11/2017 Kim .................... G06K 9/00342
2018/0330112 A1* 11/2018 Racz ................ H04N 21/85406
(Continued)

OTHER PUBLICATIONS

Campos et al., "Cinead: A system for automated audio description script generation for the visually impaired", Universal Access in the information society: International Journal, Springer Verlag, Berlin DE, Aug. 31, 2018, vol. 19, No. 1, pp. 99-111.
(Continued)

*Primary Examiner* — Sunghyoun Park
(74) *Attorney, Agent, or Firm* — Knobbe, Martens, Olson & Bear, LLP

(57) ABSTRACT

Embodiments of the present disclosure disclose a method and apparatus for commenting a video, and relate to the field of cloud computing. The method may include: acquiring content information of a to-be-processed video frame; constructing text description information based on the content information, the text description information being used to describe a content of the to-be-processed video frame; importing the text description information into a pre-trained text conversion model to obtain commentary text information corresponding to the text description information, the text conversion model being used to convert the text description information into the commentary text information; and converting the commentary text information into audio information.

11 Claims, 6 Drawing Sheets

(51) Int. Cl.
*G06T 7/246* (2017.01)
*G10L 13/02* (2013.01)
*G11B 27/10* (2006.01)
(52) U.S. Cl.
CPC .... *G11B 27/10* (2013.01); *G06T 2207/10016* (2013.01)

(56) References Cited

U.S. PATENT DOCUMENTS

| | | | |
|---|---|---|---|
| 2020/0066251 A1* | 2/2020 | Kumano | G10L 13/00 |
| 2021/0158795 A1* | 5/2021 | Liu | G06F 40/30 |
| 2021/0374277 A1* | 12/2021 | Feuz | G10L 15/30 |

OTHER PUBLICATIONS

Extended European Search Report received in Application No. EP 21165956 dated Sep. 21, 2021 in 7 pages.

* cited by examiner

METHOD AND APPARATUS FOR COMMENTING VIDEO

CROSS-REFERENCE TO RELATED APPLICATIONS

This application claims priority to Chinese Application No. 202010414326.4, filed on May 15, 2020 and entitled "Method and Apparatus for Commenting Video," which is hereby incorporated by reference in its entirety.

TECHNICAL FIELD

Embodiments of the present disclosure relate to the field of computer technology, and specifically to a method and apparatus for commenting a video.

BACKGROUND

With the massive use of smart devices and the improvement on network technology, various types of videos (for example, football videos, basketball videos, tennis videos, etc.) are widely spread on the Internet. Correspondingly, a video commentator needs to comment on video content so that the audience can understand the video content.

SUMMARY

Embodiments of the present disclosure propose a method and apparatus for commenting a video.

In a first aspect, an embodiment of the present disclosure provides a method for commenting a video, the method including: acquiring content information of a to-be-processed video frame; constructing text description information based on the content information, the text description information being used to describe a content of the to-be-processed video frame; importing the text description information into a pre-trained text conversion model to obtain commentary text information corresponding to the text description information, the text conversion model being used to convert the text description information into the commentary text information; and converting the commentary text information into audio information.

In some embodiments, the acquiring content information of the to-be-processed video frame, includes: in response to the to-be-processed video frame being a video frame, performing image recognition on the to-be-processed video frame to obtain the content information, wherein the content information includes at least one of: video type information, or person information.

In some embodiments, the acquiring content information of the to-be-processed video frame, includes: in response to the to-be-processed video frame being a plurality of to-be-processed video frames, performing image recognition on the to-be-processed video frames to determine target images; and acquiring motion information of each target image of the target images in the to-be-processed video frames.

In some embodiments, the acquiring motion information of each target image of the target images in the to-be-processed video frames, includes: setting a marking point for the each target image, and acquiring location information of the marking point in each to-be-processed video frame of the to-be-processed video frames; establishing a corresponding relationship between time information of the to-be-processed video frames and the location information; and determining the content information according to a time sequence corresponding to the time information and the corresponding relationship, the content information including action information.

In some embodiments, the constructing text description information based on the content information, includes: query part-of-speech information of the content information, wherein the part-of-speech information includes at least one of: noun, or verb; determining a sentence component corresponding to the part-of-speech information, wherein the sentence component includes at least one of: subject, predicate, or object; selecting a sentence pattern based on the sentence component, the sentence pattern including a word slot; and adding the content information to the word slot of the sentence pattern to obtain the text description information.

In some embodiments, the importing the text description information into the pre-trained text conversion model to obtain the commentary text information corresponding to the text description information, includes: querying scenario type information corresponding to the text description information, wherein the scenario type information is used to represent a scenario corresponding to the to-be-processed video frame; determining a scenario sentence pattern based on the scenario type information, wherein the scenario sentence pattern is used to describe the scenario and includes a customary description word corresponding to the scenario; and adding the text description information to the scenario sentence pattern to obtain the commentary text information.

In some embodiments, the method further includes: establishing a time matching relationship between the to-be-processed video frame and the audio information.

In a second aspect, an embodiment of the present disclosure provides an apparatus for commenting a video, the apparatus including: a content information acquisition unit, configured to acquire content information of a to-be-processed video frame; a text description information construction unit, configured to construct text description information based on the content information, the text description information being used to describe a content of the to-be-processed video frame; a commentary text information acquisition unit, configured to import the text description information into a pre-trained text conversion model to obtain commentary text information corresponding to the text description information, the text conversion model being used to convert the text description information into the commentary text information; and an audio conversion unit, configured to convert the commentary text information into audio information.

In some embodiments, the content information acquisition unit includes: a first content information acquisition subunit, configured to: in response to the to-be-processed video frame being a video frame, perform image recognition on the to-be-processed video frame to obtain the content information, wherein the content information includes at least one of: video type information, or person information.

In some embodiments, the content information acquisition unit includes: a target image determination subunit, configured to: in response to the to-be-processed video frame being a plurality of to-be-processed video frames, perform image recognition on the to-be-processed video frames to determine target images; and a second content information acquisition subunit, configured to acquire motion information of each target image of the target images in the to-be-processed video frames.

In some embodiments, the second content information acquisition subunit includes: a location information acquisition module, configured to set a marking point for the each target image, and acquire location information of the marking point in each to-be-processed video frame of the to-be-processed video frames; a corresponding relationship establishing module, configured to establish a corresponding relationship between time information of the to-be-processed video frames and the location information; and a content information acquisition module, configured to determine the content information according to a time sequence corresponding to the time information and the corresponding relationship, the content information including action information.

In some embodiments, the text description information construction unit includes: a part-of-speech querying subunit, configured to query part-of-speech information of the content information, wherein the part-of-speech information includes at least one of: noun, or verb; a sentence component determination subunit, configured to determine a sentence component corresponding to the part-of-speech information, wherein the sentence component includes at least one of: subject, predicate, or object; a sentence pattern selection subunit, configured to select a sentence pattern based on the sentence component, the sentence pattern including a word slot; and a text description information acquisition subunit, configured to add the content information to the word slot of the sentence pattern to obtain the text description information.

In some embodiments, the commentary text information acquisition unit includes: a scenario type information querying subunit, configured to query scenario type information corresponding to the text description information, wherein the scenario type information is used to represent a scenario corresponding to the to-be-processed video frame; a scenario sentence pattern determination subunit, configured to determine a scenario sentence pattern based on the scenario type information, wherein the scenario sentence pattern is used to describe the scenario and includes a customary description word corresponding to the scenario; and a commentary text information acquisition subunit, configured to add the text description information to the scenario sentence pattern to obtain the commentary text information.

In some embodiments, the apparatus further includes: a time matching relationship establishing unit, configured to establish a time matching relationship between the to-be-processed video frame and the audio information.

In a third aspect, an embodiment of the present disclosure provides an electronic device, the device electronic including: one or more processors; and a memory, storing one or more programs thereon, where the one or more programs, when executed by the one or more processors, cause the one or more processors to perform the method for commenting a video according to the first aspect.

In a fourth aspect, an embodiment of the present disclosure provides a computer readable medium, storing a computer program thereon, where the computer program, when executed by a processor, implements the method for commenting a video according to the first aspect.

The method and apparatus for commenting a video provided by embodiments of the present disclosure, first acquire the content information of the to-be-processed video frame, which is conducive to the understanding of the to-be-processed video frame; then construct the text description information based on the content information, realizing description of the video with information; after that import the text description information into the pre-trained text conversion model to obtain the commentary text information corresponding to the text description information, which improves the pertinence of video commentary; and finally convert the commentary text information into audio information.

Some embodiments of the present disclosure realize audio commentary on the video and improve the efficiency in commenting the video.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The accompanying drawings are used to better understand the present solution and do not constitute a limitation to embodiments of the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

Figure 1:
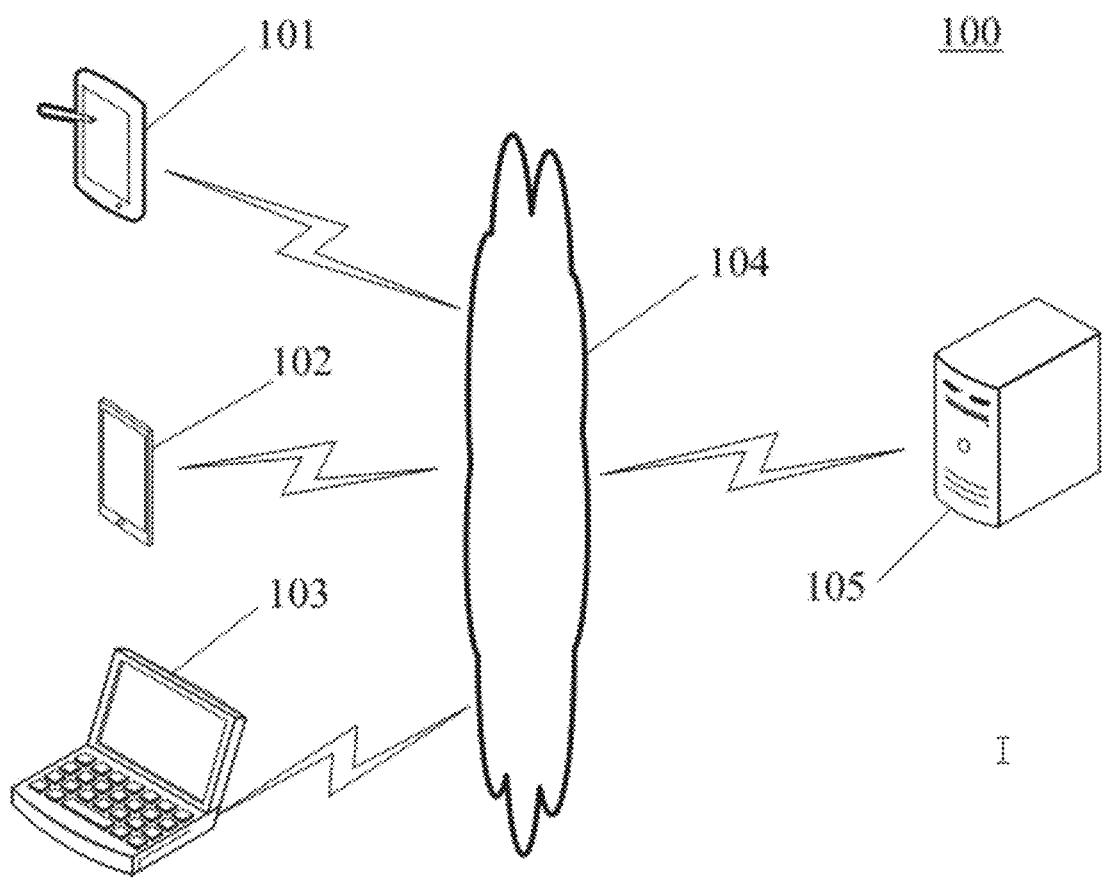
FIG. 1 is a schematic diagram according to a first embodiment of the present disclosure.

FIG. 1 illustrates an example system architecture 100 in which a method for commenting a video or an apparatus for commenting a video of embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optic fibers.

The terminal devices 101, 102, 103 may interact with the server 105 through the network 104 to receive or send messages, or the like. Various video client applications, such as video playback applications, video plug-in applications, or video conversion applications, may be installed on the terminal devices 101, 102, and 103.

The terminal devices 101, 102, 103 may be hardware or software. When the terminal devices 101, 102, 103 are hardware, the terminal devices 101, 102, 103 may be various electronic devices having display screens and supporting video playback, including but not limited to smart phones, tablet computers, laptop portable computers, desktop computers, and so on. When the terminal devices 101, 102, 103 are software, the terminal devices 101, 102, 103 may be installed in the electronic devices listed above. The terminal devices 101, 102, 103 may be implemented as a plurality of pieces of software or software modules (for example, for providing distributed services), or as a single piece of software or software module, which is not specifically limited herein.

The server 105 may be a server that provides various services, for example, a server that provides a video to the terminal devices 101, 102, and 103. The server may add commentary audio to a received video, and send the video with the added commentary audio to the terminal devices.

It should be noted that the method for commenting a video provided by embodiments of the present disclosure is generally performed by the server 105, and accordingly, the apparatus for commenting a video is generally provided in the server 105.

It should be noted that the server may be hardware or software. When the server is hardware, the server may be implemented as a distributed server cluster composed of a plurality of servers, or as a single server. When the server is software, the server may be implemented as a plurality of pieces of software or software modules (for example, for providing distributed services) or as a single piece of software or software module, which is not specifically limited herein.

It should be understood that the numbers of terminal devices, networks and servers in FIG. 1 are merely illustrative. Depending on the implementation needs, there may be any number of terminal devices, networks and servers.

Figure 2:
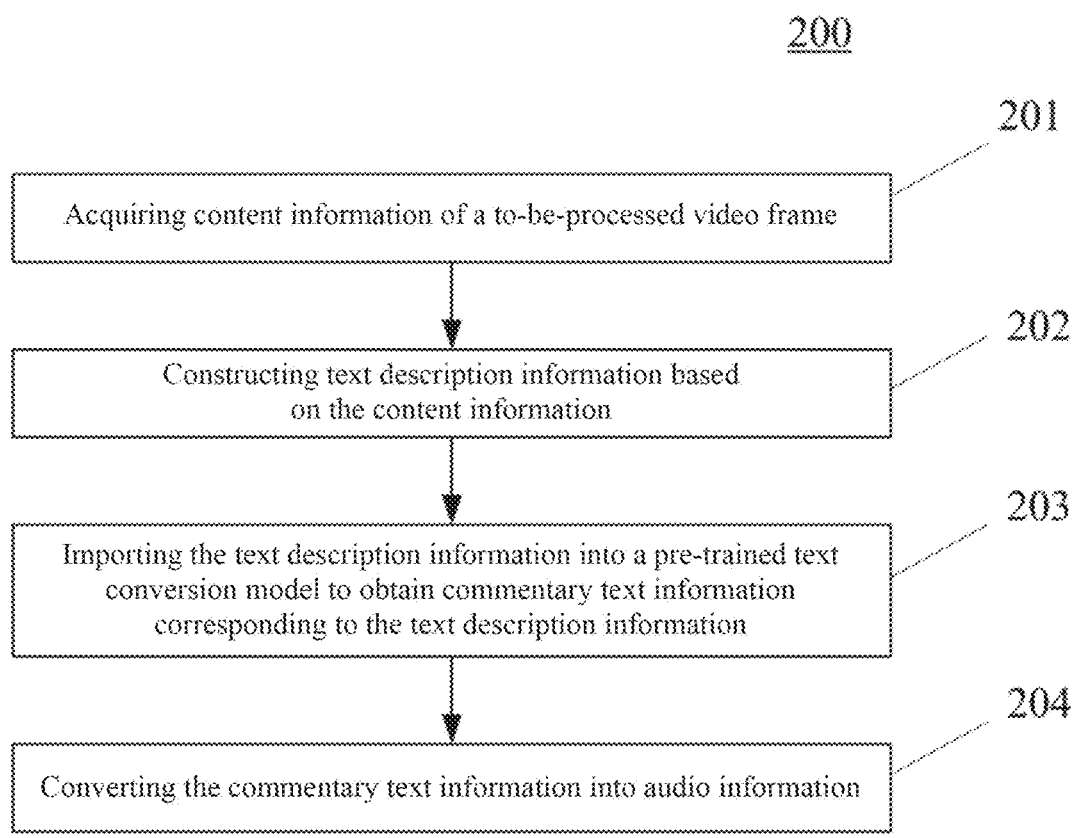
FIG. 2 is a schematic diagram according to a second embodiment of the present disclosure.

With further reference to FIG. 2, a flow 200 of a method for commenting a video according to an embodiment of the present disclosure is illustrated. The method for commenting a video includes the following steps.

Step 201, acquiring content information of a to-be-processed video frame.

In the present embodiment, an executing body of the method for commenting a video (for example, the server 105 shown in FIG. 1) may acquire the to-be-processed video frame through a wired connection or a wireless connection. It should be noted that the above wireless connection may include but is not limited to 3G/4G connection, Wi-Fi connection, Bluetooth connection, WiMAX connection, Zigbee connection, UWB (Ultra Wideband) connection, and other wireless connections that are now known or to-be-developed in the future.

The executing body may acquire the to-be-processed video frame from the network or other devices. The to-be-processed video frame may be a video frame of a recorded non-real-time video, or a video frame of a real-time video. The executing body may acquire the content information in the to-be-processed video frame through a variety of methods, which is conducive to the understanding of the to-be-processed video frame. For example, the executing body may translate audio information in the video, or convert the audio in the video into text information. Correspondingly, the audio information and the text information are the content information.

Step 202, constructing text description information based on the content information.

After obtaining the content information, the executing body may construct the text description information based on the content information through natural language processing and other methods. That is, the text description information may be used to describe the content of the to-be-processed video frame. In this way, description of the video with information is realized.

Step 203, importing the text description information into a pre-trained text conversion model to obtain commentary text information corresponding to the text description information.

After obtaining the text description information, the executing body may import the text description information into the pre-trained text conversion model to obtain the commentary text information corresponding to the text description information. The text conversion model is used to convert the text description information into the commentary text information, which improves the pertinence of video commentary. The text conversion model may be an intelligent network such as a known deep learning network that realizes information conversion.

Step 204, converting the commentary text information into audio information.

The executing body may convert the commentary text information into the audio information using a method such as text to audio conversion. The audio information is commentary information of the to-be-processed video frame. In this way, audio commentary on the video is realized, and the efficiency in commenting the video is improved.

Figure 3:
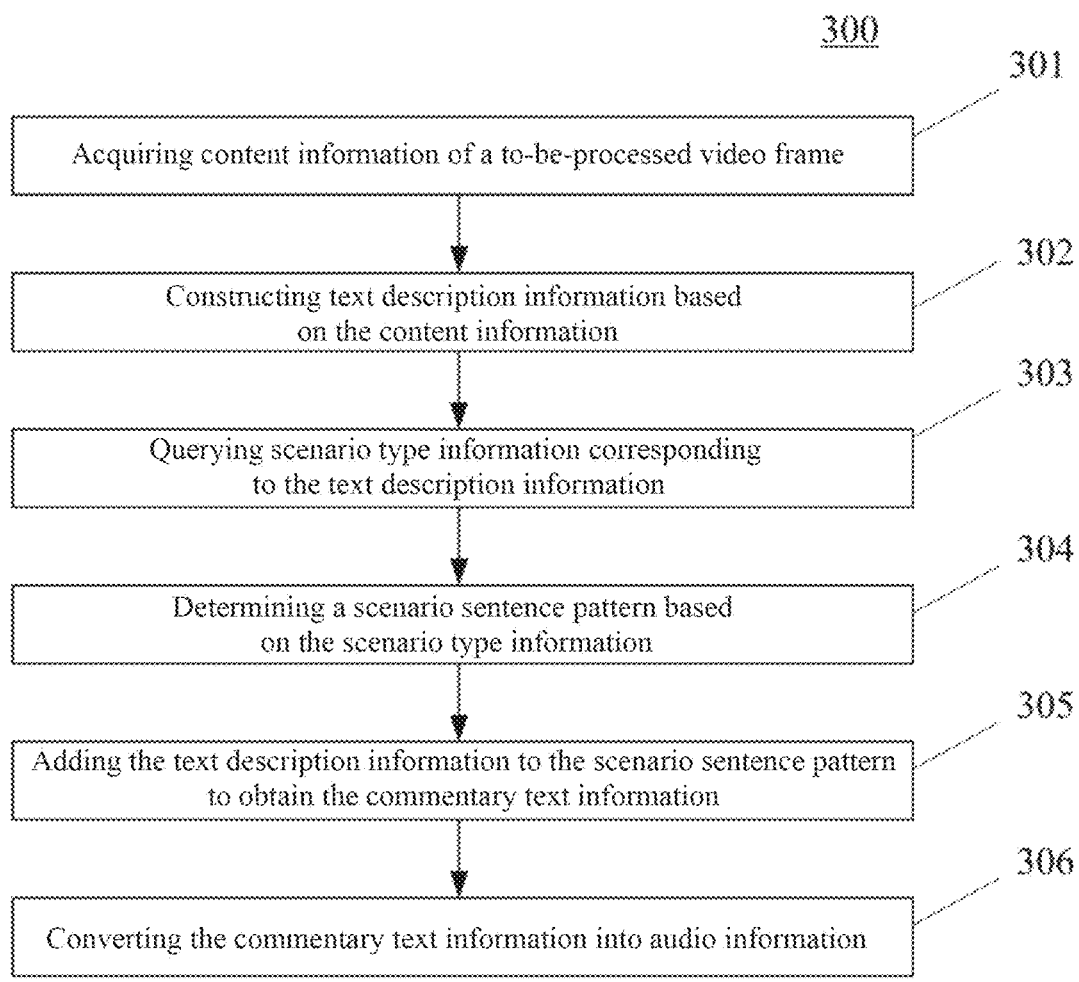
FIG. 3 is a schematic diagram according to a third embodiment of the present disclosure.

With further reference to FIG. 3, a flow 300 of the method for commenting a video according to an embodiment of the present disclosure is illustrated. The method for commenting a video includes the following steps.

Step 301, acquiring content information of a to-be-processed video frame.

The content of step 301 is the same as that of step 201, and detailed description thereof will be omitted.

In some alternative implementations of the present embodiment, the acquiring content information of the to-be-processed video frame, may include: performing image recognition on the to-be-processed video frame to obtain the content information, in response to the to-be-processed video frame being a video frame.

If the to-be-processed video frame is one video frame, the executing body may perform image recognition on the to-be-processed video frame to obtain the content information corresponding to the to-be-processed video frame. Since there is only one to-be-processed video frame, and image recognition may recognize person images, ball images, animal images, etc. in the to-be-processed video frame, it may be further determined that the content information of the to-be-processed video frame may be person information (for example, name, gender, etc.), video type information (football video, basketball video, tennis video, etc.). For different to-be-processed video frames, the corresponding content information may be different.

That is, the above content information may include at least one of the following: video type information or person information. In this way, static information acquisition of the to-be-processed video frame is realized.

In some alternative implementations of the present embodiment, the acquiring content information of the to-be-processed video frame, may include the following steps.

First step, in response to the to-be-processed video frame being a plurality of to-be-processed video frames, performing image recognition on the to-be-processed video frames to determine target images.

If the to-be-processed video frame is a plurality of to-be-processed video frames, not only static information such as person information may be acquired from the to-be-processed video frame, but also related dynamic information may also be acquired. It should be noted that, in practice, the plurality of consecutive video frames obtained by the executing body are generally a plurality of consecutive video frames acquired in real time, or consecutive video frames in a historical video. To this end, the executing body may perform image recognition on the to-be-processed video frames to determine the target images. The target image may be an image of a movable object such as a person image or an animal image.

Second step, acquiring motion information of each target image of the target images in the to-be-processed video frames.

After determining the target image, the executing body may acquire the motion information of the each target image in the to-be-processed video frames, and then determine the motion information of the each target image. In this way, dynamic information acquisition of the to-be-processed video frames is realized.

In some alternative implementations of the present embodiment, the acquiring motion information of each target image of the target images in the to-be-processed video frame, may include the following steps.

First step, setting a marking point for the each target image, and acquiring location information of the marking point in each to-be-processed video frame of the to-be-processed video frames.

In order to acquire accurate motion information of the target image, the executing body may set the marking point on the target image. The number of marking points depends on actual needs. The marking point is set at a feature location of the target image. For example, when the target image is a person image, marking points may be respectively set at feature locations such as the hand and foot of the character image that easily reflect the movement. After setting the marking point, the location information of the marking point in the to-be-processed video frames may be acquired.

Second step, establishing a corresponding relationship between time information of the to-be-processed video frames and the location information.

Each to-be-processed video frame has a corresponding time stamp. The executing body may establish the corresponding relationship between the time information of the to-be-processed video frames and the location information, in order to determine change information of the marking point over time. If the to-be-processed video frames do not have time information, the executing body may also set the time information for the to-be-processed video frames based on local time information, or according to the sequence of the to-be-processed video frames.

Third step, determining the content information according to a time sequence corresponding to the time information and the corresponding relationship.

After establishing the corresponding relationship, the executing body may determine the change information of each marking point over time according to the time sequence, and then obtain the content information. In this regard, the content information may include action information. Here, if the change information of each marking point in the to-be-processed video frames is separately acquired, the content information may be the action information corresponding to each marking point. If relative change information between the marking points is acquired, the content information may be the action information of a target object. In this way, dynamic commentary on the video is realized.

Step 302, constructing text description information based on the content information.

The content of step 302 is the same as that of step 202, and detailed description thereof will be omitted.

In some alternative implementations of the present embodiment, the constructing text description information based on the content information, may include the following steps.

First step, querying part-of-speech information of the content information.

In order to construct the text description information, the executing body may first query the part-of-speech information of the content information. The part-of-speech information may include at least one of the following: noun, or verb. For example, the content information may be: "player A", "football", "in the goal". The corresponding part-of-speech information may be noun, noun and noun.

Second step, determining a sentence component corresponding to the part-of-speech information.

After determining the part-of-speech information, the executing body may further determine the sentence component of the part-of-speech information. The sentence component may include at least one of the following: subject, predicate, or object. For example, the content information may be: "player A", "football", "in the goal". The corresponding part-of-speech information may be noun, noun and noun. Then, "player A", "football", and "in the goal" may all be used as subjects or objects. Based on the actual situation of football, the executing body may use "player A" as the subject, "football" as the object, and "in the goal" as a complement.

Third step, selecting a sentence pattern based on the sentence component.

After determining the sentence component, the executing body may select the corresponding sentence pattern based on the sentence component, and the sentence pattern may include a word slot. For example, the sentence pattern may be:

subject+predicate+object+complement. Considering that it is football, the predicate may be predetermined as "kick", and because there is the complement "in the goal", the predicate may be "kick into". The corresponding sentence pattern may be subject+"kick into"+object+complement. Correspondingly, the "subject", "object" and "complement" in the sentence pattern may be word slots to be filled.

Fourth step, adding the content information to the word slot of the sentence pattern to obtain the text description information.

After obtaining the sentence pattern, the executing body may add the content information to the corresponding word slot, to obtain the text description information. In this way, text description of the to-be-processed video frame is realized.

Step 303, querying scenario type information corresponding to the text description information.

The text description information may be used to describe the content of the to-be-processed video frame. Therefore, the executing body may query the scenario type information corresponding to the to-be-processed video frame through the text description information, or the scenario type information may be considered as corresponding to the text description information. The scenario type information may be used to represent a scenario corresponding to the to-be-processed video frame. For example, the text description information may be: "player A kicks the football to player B". The executing body detects that the text description information contains "football" and further contains "player A" "kicks to" and "player B", then the executing body determines that the scenario type information may be "football". For different to-be-processed video frames, the corresponding scenario type information may also be: "basketball", "tennis", etc.

Step 304, determining a scenario sentence pattern based on the scenario type information.

In basketball, commonly used description text may include "player A assists player B, player B dunks", etc. In football, commonly used description text may include: "player A crosses player B from the left, player B dribbles and shoots the goal", etc. Here, "player A assists player B, player B dunks" may be considered as a corresponding scenario sentence pattern in basketball scenarios. "player A crosses player B from the left, player B dribbles and shoots the goal" may be considered as a corresponding scenario sentence pattern in football scenarios. That is, different scenarios correspond to different scenario sentence patterns. The above scenario sentence pattern may be used to describe the above scenario. Correspondingly, "assist" and "dunk" may be considered as customary description words in basketball scenarios; and "cross from the left", "dribble" and "shoot the goal" may be considered as customary description words in football scenarios. Therefore, the scenario sentence pattern may include a customary description word corresponding to the scenario. In this way, it is beneficial to describe the to-be-processed video frame pertinently.

Step 305, adding the text description information to the scenario sentence pattern to obtain the commentary text information.

After determining the scenario sentence pattern, the executing body may add the text description information to the scenario sentence pattern to obtain the commentary text information. It should be noted that, when adding the text description information to the scenario sentence pattern, the executing body may select part of the text description information or convert the information in the text description information to obtain the commentary text. For example, the text description information may be: "player A kicks the football to player B". The scenario sentence pattern of the corresponding football scenario may be: "player A crosses player B from the left". Here, the "player A" and "player B" in the scenario sentence pattern may be considered to be directly added to the scenario sentence pattern from the "player A" and "player B" in the text description information. The "cross from the left" in the scenario sentence pattern may be considered to be obtained by synonymous conversion of the "kick to" in the text description information based on the football scenario. In this way, information conversion based on the scenario is realized, and the to-be-processed video frame can be described pertinently.

Step 306, converting the commentary text information into audio information.

The content of step 306 is the same as that of step 204, and detailed description thereof will be omitted.

Figure 4:
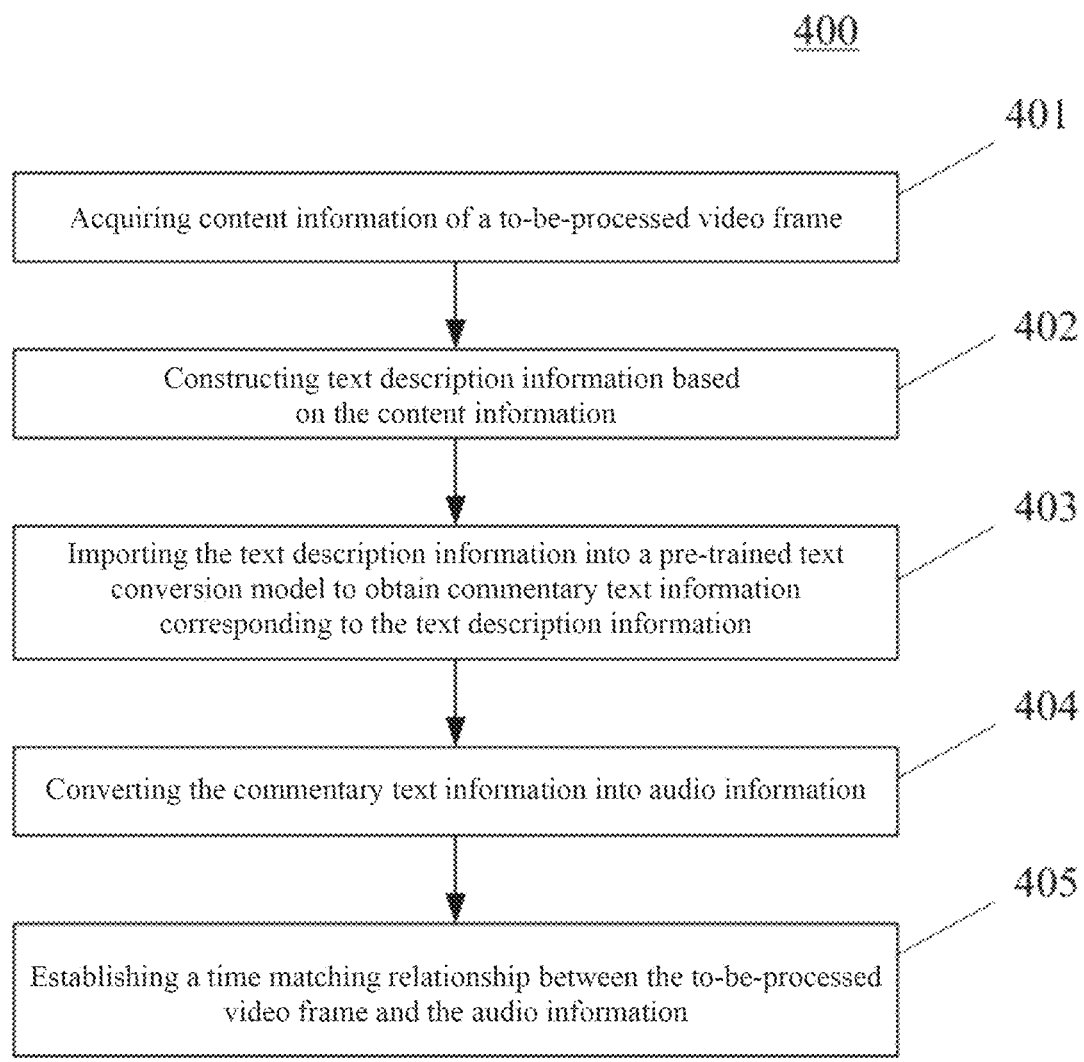
FIG. 4 is a schematic diagram according to a fourth embodiment of the present disclosure.

With further reference to FIG. 4, a flow 400 of another embodiment of the method for commenting a video is illustrated. The flow 400 of the method for commenting a video includes the following steps.

Step 401, acquiring content information of a to-be-processed video frame.

The content of step 401 is the same as that of step 201, and detailed description thereof will be omitted.

Step 402, constructing text description information based on the content information.

The content of step 402 is the same as that of step 202, and detailed description thereof will be omitted.

Step 403, importing the text description information into a pre-trained text conversion model to obtain commentary text information corresponding to the text description information.

The content of step 403 is the same as that of step 203, and detailed description thereof will be omitted.

Step 404, converting the commentary text information into audio information.

The content of step 404 is the same as that of step 204, and detailed description thereof will be omitted.

Step 405, establishing a time matching relationship between the to-be-processed video frame and the audio information.

The process of obtaining the audio information takes some time. In order to avoid audio lagging image when the user views the to-be-processed video frame, the executing body may establish the time matching relationship between the to-be-processed video frame and the audio information, so that the to-be-processed video frame and the audio information can be synchronized in time. In this way, the accuracy and effectiveness of video commentary are improved.

Figure 5:
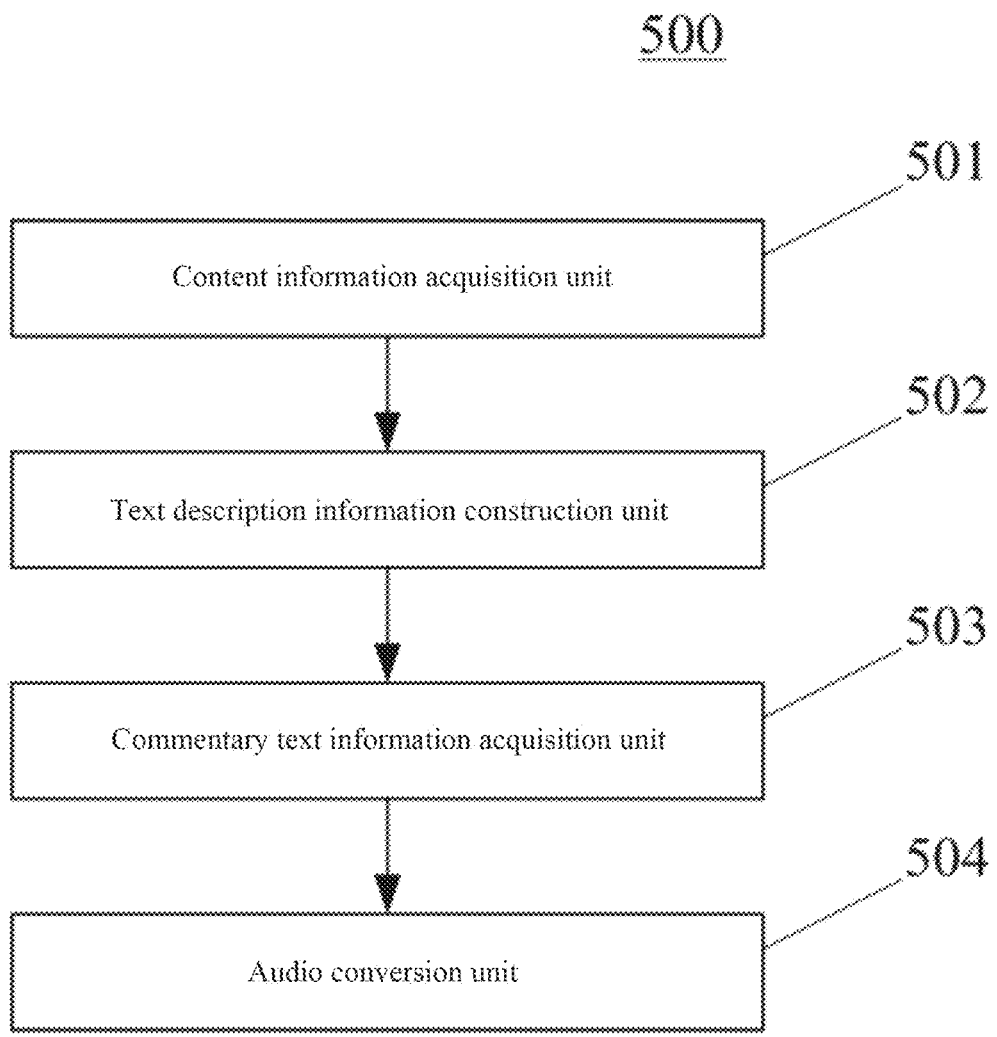
FIG. 5 is a block diagram of an electronic device used to implement the method for commenting a video of embodiments of the present disclosure.

With further reference to FIG. 5, as an implementation of the method shown in the above figures, an embodiment of the present disclosure provides an apparatus for commenting a video, and the apparatus embodiment corresponds to the method embodiment as shown in FIG. 2. The apparatus may be specifically applied to various electronic devices.

As shown in FIG. 5, the apparatus 500 for commenting a video of the present embodiment may include: a content information acquisition unit 501, a text description information construction unit 502, a commentary text information acquisition unit 503 and an audio conversion unit 504. The content information acquisition unit 501 is configured to acquire content information of a to-be-processed video frame. The text description information construction unit 502 is configured to construct text description information based on the content information, the text description information being used to describe a content of the to-be-processed video frame. The commentary text information acquisition unit 503 is configured to import the text description information into a pre-trained text conversion model to obtain commentary text information corresponding to the text description information, and the text conversion model is used to convert the text description information into the commentary text information. The audio conversion unit 504 is configured to convert the commentary text information into audio information.

In some alternative implementations of the present embodiment, the content information acquisition unit 501 may include: a first content information acquisition subunit (not shown in the figure), configured to: in response to the to-be-processed video frame being a video frame, perform image recognition on the to-be-processed video frame to obtain the content information, and the content information includes at least one of: video type information, or person information.

In some alternative implementations of the present embodiment, the content information acquisition unit 501 may include: a target image determination subunit (not shown in the figure) and a second content information acquisition subunit (not shown in the figure). The target image determination subunit is configured to: in response to the to-be-processed video frame being a plurality of to-be-processed video frames, perform image recognition on the to-be-processed video frames to determine target images. The second content information acquisition subunit is configured to acquire motion information of each target image of the target images in the to-be-processed video frames.

In some alternative implementations of the present embodiment, the second content information acquisition subunit may include: a location information acquisition module (not shown in the figure), a corresponding relationship establishing module (not shown in the figure) and a content information acquisition module (not shown in the figure). The location information acquisition module is configured to set a marking point for the each target image, and acquire location information of the marking point in each to-be-processed video frame of the to-be-processed video frames. The corresponding relationship establishing module is configured to establish a corresponding relationship between time information of the to-be-processed video frames and the location information. The content information acquisition module is configured to determine the content information according to a time sequence corresponding to the time information and the corresponding relationship, and the content information includes action information.

In some alternative implementations of the present embodiment, the text description information construction unit 502 may include: a part-of-speech querying subunit (not shown in the figure), a sentence component determination subunit (not shown in the figure), a sentence pattern selection subunit (not shown in the figure) and a text description information acquisition subunit (not shown in the figure). The part-of-speech querying subunit is configured to query part-of-speech information of the content information, where the part-of-speech information includes at least one of: noun, or verb. The sentence component determination subunit is configured to determine a sentence component corresponding to the part-of-speech information, where the sentence component includes at least one of: subject, predicate, or object. The sentence pattern selection subunit is configured to select a sentence pattern based on the sentence component, the sentence pattern including a word slot. The text description information acquisition subunit is configured to add the content information to the word slot of the sentence pattern to obtain the text description information.

In some alternative implementations of the present embodiment, the commentary text information acquisition unit 503 may include: a scenario type information querying subunit (not shown in the figure), a scenario sentence pattern determination subunit (not shown in the figure) and a commentary text information acquisition subunit (not shown in the figure). The scenario type information querying subunit is configured to query scenario type information corresponding to the text description information, where the scenario type information is used to represent a scenario corresponding to the to-be-processed video frame. The scenario sentence pattern determination subunit is configured to determine a scenario sentence pattern based on the scenario type information, where the scenario sentence pattern is used to describe the scenario and includes a customary description word corresponding to the scenario. The commentary text information acquisition subunit is configured to add the text description information to the scenario sentence pattern to obtain the commentary text information.

In some alternative implementations of the present embodiment, the apparatus 500 for commenting a video further includes: a time matching relationship establishing unit (not shown in the figure), configured to establish a time matching relationship between the to-be-processed video frame and the audio information.

According to an embodiment of the present disclosure, the present disclosure further provides an electronic device and a readable storage medium.

Figure 6:
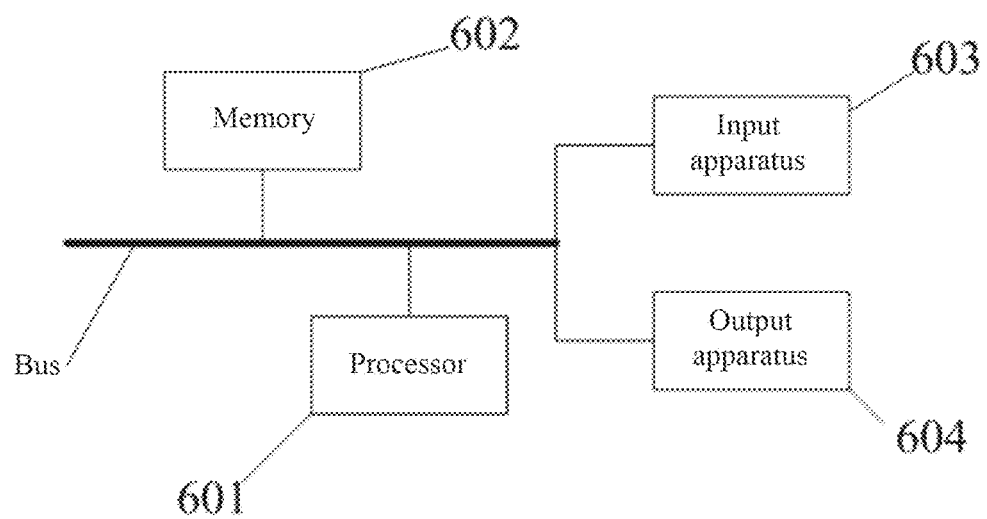
FIG. 6 is a schematic structural diagram of an electronic device suitable for implementing embodiments of the present disclosure.

As shown in FIG. 6, a block diagram of an electronic device of the method for commenting a video according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 6, one processor 601 is used as an example.

The memory 602 is a non-transitory computer readable storage medium provided by embodiments of the present disclosure. The memory stores instructions executable by at least one processor, so that the at least one processor performs the method for commenting a video provided by embodiments of the present disclosure. The non-transitory computer readable storage medium of embodiments of the present disclosure stores computer instructions for causing a computer to perform the method for commenting a video provided by embodiments of the present disclosure.

The memory 602, as a non-transitory computer readable storage medium, may be used to store non-transitory software programs, non-transitory computer executable programs and modules, such as program instructions/modules corresponding to the method for commenting a video in embodiments of the present disclosure (for example, the content information acquisition unit 501, the text description information construction unit 502, the commentary text information acquisition unit 503 and the audio conversion unit 504 as shown in FIG. 5). The processor 601 executes the non-transitory software programs, instructions, and modules stored in the memory 602 to execute various functional applications and data processing of the server, that is, to implement the method for commenting a video in the foregoing method embodiments.

The memory 602 may include a storage program area and a storage data area, where the storage program area may store an operating system and at least one function required application program; and the storage data area may store data created by the use of the electronic device for commenting a video. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device for commenting a video through a network. Examples of the above network include but are not limited to the Internet, intranet, local area network, mobile communication network, and combinations thereof.

The electronic device of the method for commenting a video may further include: an input apparatus 603 and an output apparatus 604. The processor 601, the memory 602, the input apparatus 603, and the output apparatus 604 may be connected through a bus or in other methods. In FIG. 6, connection through the bus is used as an example.

The input apparatus 603 may receive input digital or character information, and generate key signal inputs related to user settings and function control of the electronic device for commenting a video, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the block chain network.

The computer system may include a client and a server. The client and the server are generally remote from each other and typically interact through the communication network. The relationship between the client and the server is generated through computer programs running on the respective computer and having a client-server relationship to each other.

According to the technical solution of embodiments of the present disclosure, first the content information of the to-be-processed video frame is acquired, which is conducive to the understanding of the to-be-processed video frame; then the text description information is constructed based on the content information, realizing description of the video with information; after that the text description information is imported into the pre-trained text conversion model to obtain the commentary text information corresponding to the text description information, which improves the pertinence of video commentary; and finally the commentary text information is converted into audio information. Some embodiments of the present disclosure realize audio commentary on the video and improve the efficiency in commenting the video.

It should be understood that the various forms of processes shown above may be used to resort, add or delete steps. For example, the steps described in some embodiments of the present disclosure may be performed in parallel, sequentially, or in a different order. As long as the desired result of the technical solution disclosed in the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for commenting a video, the method comprising:
acquiring content information of a to-be-processed video frame;
constructing text description information based on the content information, the text description information being used to describe a content of the to-be-processed video frame;
importing the text description information into a pre-trained text conversion model to obtain commentary text information corresponding to the text description information, the text conversion model being used to convert the text description information into the commentary text information; and converting the commentary text information into audio information;

wherein the acquiring the content information of the to-be-processed video frame, comprises:
in response to the to-be-processed video frame being a plurality of to-be-processed video frames, performing image recognition on the to-be-processed video frames to determine target images;
setting a marking point on each target image of the target images, and acquiring location information of the marking point in each to-be-processed video frame of the to-be-processed video frames;
establishing a corresponding relationship between time information of the to-be-processed video frames and the location information; and
determining the content information according to a time sequence corresponding to the time information and the corresponding relationship between time information of the to-be-processed video frames and the location information, wherein the content information comprises action information.

2. The method according to claim 1, wherein the acquiring content information of the to-be-processed video frame, further comprises:
in response to the to-be-processed video frame being a video frame, performing image recognition on the to-be-processed video frame to obtain the content information, wherein the content information comprises at least one of: video type information, or person information.

3. The method according to claim 1, wherein the constructing text description information based on the content information, comprises:
query part-of-speech information of the content information, wherein the part-of-speech information comprises at least one of: noun, or verb;
determining a sentence component corresponding to the part-of-speech information, wherein the sentence component comprises at least one of: subject, predicate, or object;
selecting a sentence pattern based on the sentence component, the sentence pattern comprising a word slot; and
adding the content information to the word slot of the sentence pattern to obtain the text description information.

4. The method according to claim 1, wherein the importing the text description information into the pre-trained text conversion model to obtain the commentary text information corresponding to the text description information, comprises:
querying scenario type information corresponding to the text description information, wherein the scenario type information is used to represent a scenario corresponding to the to-be-processed video frame;
determining a scenario sentence pattern based on the scenario type information, wherein the scenario sentence pattern is used to describe the scenario and comprises a customary description word corresponding to the scenario; and
adding the text description information to the scenario sentence pattern to obtain the commentary text information.

5. The method according to claim 1, wherein the method further comprises:
establishing a time matching relationship between the to-be-processed video frame and the audio information.

6. An electronic device, comprising:
one or more processors; and
a memory storing one or more programs thereon,
the one or more programs, when executed by the one or more processors, causing the one or more processors to perform operations, the operations comprising:
acquiring content information of a to-be-processed video frame;
constructing text description information based on the content information, the text description information being used to describe a content of the to-be-processed video frame;
importing the text description information into a pre-trained text conversion model to obtain commentary text information corresponding to the text description information, the text conversion model being used to convert the text description information into the commentary text information; and
converting the commentary text information into audio information;
wherein the acquiring the content information of the to-be-processed video frame, comprises:
in response to the to-be-processed video frame being a plurality of to-be-processed video frames, performing image recognition on the to-be-processed video frames to determine target images;
setting a marking point on each target image of the target images, and acquiring location information of the marking point in each to-be-processed video frame of the to-be-processed video frames;
establishing a corresponding relationship between time information of the to-be-processed video frames and the location information; and
determining the content information according to a time sequence corresponding to the time information and the corresponding relationship between time information of the to-be-processed video frames and the location information, wherein the content information comprises action information.

7. The electronic device according to claim 6, wherein the acquiring content information of the to-be-processed video frame, further comprises:
in response to the to-be-processed video frame being a video frame, performing image recognition on the to-be-processed video frame to obtain the content information, wherein the content information comprises at least one of: video type information, or person information.

8. The electronic device according to claim 6, wherein the constructing text description information based on the content information, comprises:
query part-of-speech information of the content information, wherein the part-of-speech information comprises at least one of: noun, or verb;
determining a sentence component corresponding to the part-of-speech information, wherein the sentence component comprises at least one of: subject, predicate, or object;
selecting a sentence pattern based on the sentence component, the sentence pattern comprising a word slot; and adding the content information to the word slot of the sentence pattern to obtain the text description information.

9. The electronic device according to claim 6, wherein the importing the text description information into the pre-trained text conversion model to obtain the commentary text information corresponding to the text description information, comprises:
  querying scenario type information corresponding to the text description information, wherein the scenario type information is used to represent a scenario corresponding to the to-be-processed video frame;
  determining a scenario sentence pattern based on the scenario type information, wherein the scenario sentence pattern is used to describe the scenario and comprises a customary description word corresponding to the scenario; and
  adding the text description information to the scenario sentence pattern to obtain the commentary text information.

10. The electronic device according to claim 6, wherein the method further comprises:
  establishing a time matching relationship between the to-be-processed video frame and the audio information.

11. A non-transitory computer readable medium, storing a computer program thereon, the program, when executed by a processor, causing the processor to perform operations comprising:
  acquiring content information of a to-be-processed video frame;
  constructing text description information based on the content information, the text description information being used to describe a content of the to-be-processed video frame;
  importing the text description information into a pre-trained text conversion model to obtain commentary text information corresponding to the text description information, the text conversion model being used to convert the text description information into the commentary text information; and
  converting the commentary text information into audio information;
  wherein the acquiring the content information of the to-be-processed video frame, comprises:
    in response to the to-be-processed video frame being a plurality of to-be-processed video frames, performing image recognition on the to-be-processed video frames to determine target images;
    setting a marking point on each target image of the target images, and acquiring location information of the marking point in each to-be-processed video frame of the to-be-processed video frames;
    establishing a corresponding relationship between time information of the to-be-processed video frames and the location information; and
    determining the content information according to a time sequence corresponding to the time information and the corresponding relationship between time information of the to-be-processed video frames and the location information, wherein the content information comprises action information.

* * * * *